United States Patent [19]

Suzuki

[11] Patent Number: 4,828,370
[45] Date of Patent: May 9, 1989

[54] SWITCHING ELEMENT WITH NONLINEAR RESISTIVE, NONSTOICHIOMETRIC MATERIAL

[75] Inventor: Mitsuya Suzuki, Tokyo, Japan

[73] Assignee: Seiko Instruments & Electronics Ltd., Tokyo, Japan

[21] Appl. No.: 784,239

[22] Filed: Oct. 4, 1985

[30] Foreign Application Priority Data

Oct. 16, 1984 [JP] Japan .................. 59-216582

[51] Int. Cl.$^4$ .............................. G02F 1/13
[52] U.S. Cl. .................. 350/339 R; 350/333; 350/336; 350/334
[58] Field of Search ............. 350/339 R, 334, 333, 350/332, 336, 354; 357/15

[56] References Cited

U.S. PATENT DOCUMENTS

| | | | |
|---|---|---|---|
| 4,223,308 | 9/1980 | Baraff et al. | 340/719 |
| 4,240,710 | 12/1980 | Kozaki et al. | 350/339 R |
| 4,413,883 | 11/1983 | Baraff et al. | 350/334 |
| 4,470,667 | 9/1984 | Okubo et al. | 350/334 |
| 4,572,615 | 2/1986 | Nickol et al. | 350/334 |

FOREIGN PATENT DOCUMENTS 2460916 7/1975 Fed. Rep. of Germany ... 350/339 R
2050031 12/1980 United Kingdom .

OTHER PUBLICATIONS

Gladstone et al., "Liquid Crystal Display Devices", IBM Technical Disclosure Bulletin, vol. 14, No. 5, Oct. 1971, pp. 1472–1473.

*Primary Examiner*—John S. Heyman
*Assistant Examiner*—Anita E. Pellman
*Attorney, Agent, or Firm*—Bruce L. Adams; Van C. Wilks

[57] ABSTRACT

A matrix electro-optical device is comprised of a plurality of picture elements arranged in a row-and-column matrix. A plurality of switching elements are formed on a substrate of the device and are series-connected to the respective picture elements to selectively drive the picture elements. The switching element is comprised of a non-linear-resistive layer composed of non-stoichiometric silicon nitride or silicon oxide and interposed between a pair of electro-conductive layers.

47 Claims, 2 Drawing Sheets

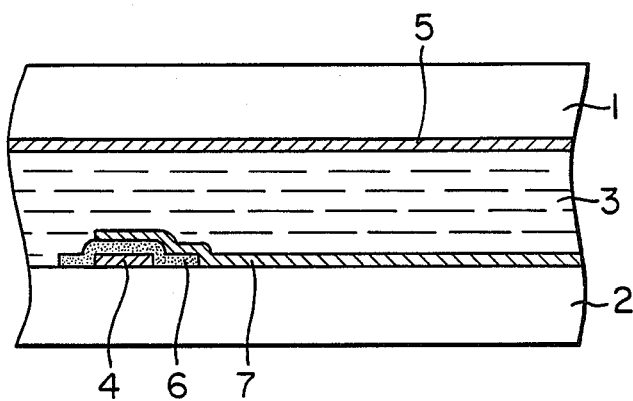
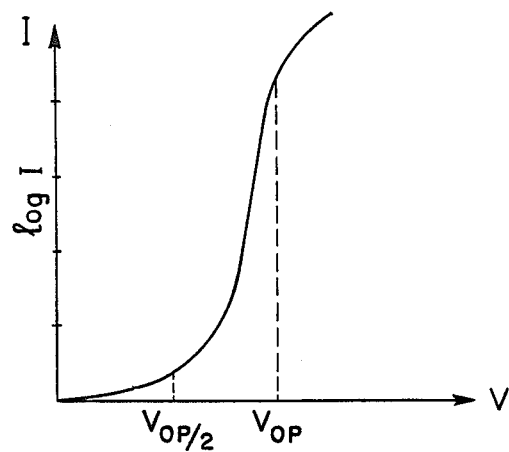
FIG. 4a    FIG. 4b
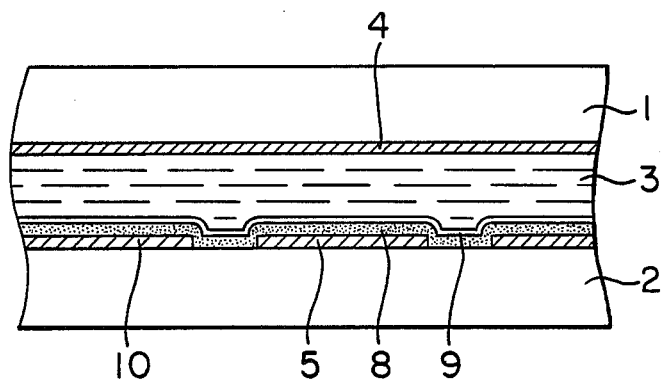
FIG. 5
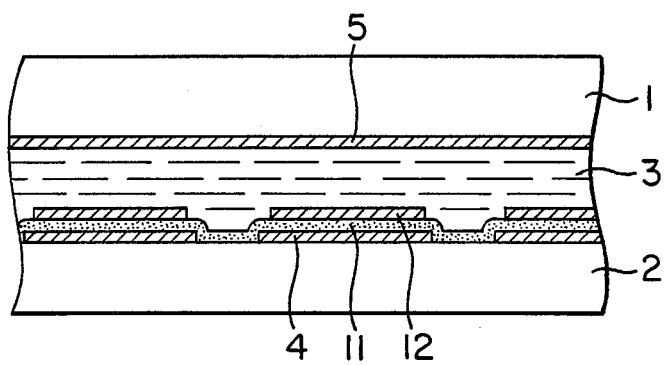
FIG. 6

SWITCHING ELEMENT WITH NONLINEAR RESISTIVE, NONSTOICHIOMETRIC MATERIAL

BACKGROUND OF THE INVENTION

This invention relates to a liquid crystal display device having non-linear type material sandwiched between the liquid crystal and the liquid crystal driving electrodes.

Conventionally, a liquid crystal display device which is a compact, light and electrically low-consuming display device has been in practical use. Recently, in order to increase the displaying information amount of this liquid crystal display device, the following three types of liquid crystal display devices are known; a MOS type liquid crystal display device utilizing a silicon single crystal substrate; a Thin Film Transistor liquid crystal display device with a semi-conductive layer formed on glass substrates; a MIM type liquid crystal display device utilizing a non-linear element composed of Metal-Insulator-Metal. As the MOS type liquid crystal display device utilizes silicon single crystal at its substrate, it is not possible to enlarge its size. The Thin Film Transistor liquid crystal display device has some possibilities of enlarging its size, but it has such defects as, being necessary to form more than five layers of thin film layers, patterning is necessary, the picture element deficiency rate is high, and the cost is expensive. In contrast to the above two types, the MIM type liquid crystal display device has a relatively simple structure, having a possibility of enlarging its size. FIG. 1 is a diagram of a circuit wherein the display panel is driven in an X-Y matrix mode and, the display panel has the conventionally known non-linear element composed of Metal-Insulator-Metal which is serially connected with the liquid crystal. Numeral 21 is a line or column electrode group, numeral 22 is a row electrode group, usually composed of 200 to 1,000 columns and rows. At each of the intersections of X-Y electrodes, liquid crystal 23 and a non-linear-resistive element 24 are formed. This type of display device is driven with a method called multiplex driving method. In this driving method, assuming the electrical voltage to be applied to the displaying or selected picture element as $V_S$, the electrical voltage to be applied to the non-displaying or non-selected picture element as $V_{NS}$, the driving margin can be expressed as the following formula:

$$M = \frac{V_S}{V_{NS}} = \sqrt{\frac{n + a^2 - 1}{n + (a - 2)^2 - 1}} \quad (1)$$

n=division number (X the number of electrodes)
a=bias number (generally $\frac{1}{3}$ to $\frac{1}{4}$)

It can be understood that the display lighting voltage $V_S$ and the display eliminating voltage $V_{NS}$ of the liquid crystal gradually approach to each other, and, the driving marging becomes close to 1 as the division number n increases to obtain as much display picture elements as possible. Thus the liquid crystal needs to stand up or respond as fast as possible. But with the present liquid crystal, the division number n is only about 100, and so the liquid crystal cannot stand up or respond immediately. Therefore, to improve the standing up or respond characteristic of this liquid crystal, non-linear-resistive elements are serially connected to the liquid crystal.

FIG. 2 shows the characteristic of applied voltage corresponding to the transmission factor of the conventional liquid crystal. Graph 25 is the usual characteristic of twist nematic type liquid crystal, and graph 26 shows its characteristic when a Metal-Insulator-Metal non linear element is serially connected to the twist nematic type liquid crystal. In this case, the standing up or response of the liquid crystal becomes very fast, the threshold voltage $V_{TH}$ shifts to the high voltage side, and thus very large driving margin can be obtained.

FIG. 3 is a sectional diagram showing a conventionally known non-linear-resistivity element formed on liquid crystal panels. Numerals 27, 28 in FIG. 3 are upper and lower transparent substrates, 29 is liquid crystal, 30 is metal tantalum, 31 is a insulative layer of tantalic pentoxide ($Ta_2O_5$) formed by the anodic oxidation of metal tantalum, and 32 is a transparent electrode for picture element display. This type of non-linear-resistive elements is comprised of thin insulative films, and the electric current passing through these elements are called either Poole-Frenkel current, or Fowler-Nordheim tunnel current. To pass these currents, the thickness of the insulative layer must be made extremely thin, of about 50 to 400 Å. Non-linear-resistive element and liquid crystal are serially connected, and, to drive the selecting point, the electric charge is poured into the liquid crystal layer through the non-linear-resistive element. In the case of erasing the display, the electric charge disappears through the resistance of the liquid crystal. The driving is conducted by multiplex driving.

To conduct smoothly the displaying and erasing operations of the liquid crystal device which utilizes this type of non-linear-resistive element, the non-linear-resistive element must be provided with the following characteristics; assuming the capacity of non-linear-resistive element of one picture element as $C_{MIM}$, and the capacity of the liquid crystal as $C_{LC}$, at least $C_{MIM} < C_{LC}$; assuming the ON resistance of the non-linear-resistive element of one picture element as $R_{ON}$, and the resistance of the liquid crystal as $R_{LC}$, approximately, $R_{ON} = R_{LC}/30$.

To satisfy the above conditions, the dimension of the non-linear-resistive element must be less than 20 $\mu m^2$, and the highest electric current to pass through the non-linear-resistive element must be about 1 $A/cm^2$. The driving the liquid crystal is matrix driving, and the electric field that is applied to the picture element is alternating voltage. Generally, when 1 $A/cm^2$ of electric current is repeatedly passed through the insulative layer, the breakdown of the insulator may occur when $10^4$ to $10^7$ times current passes through. Therefore, there is a problem in the life-time of the insulator. Also, when utilizing $Ta_2O_5$ as non-linear-resistance element, because the layer is so thin less than 400 Å, and also the specific inductive capacity is so high as more than 10, the size of the non-linear-resistive element must be established to be less than 20 $\mu m^2$. Therefore, when forming a large size display panel of more than 20 $cm^2$, patterning with very high accuracy must be conducted, and it causes the decline of manufacturing yield, and high cost.

SUMMARY OF THE INVENTION

It is an object of the present invention to solve the above defects, and to offer a long-life and low-cost liquid crystal display device.

BRIEF DESCRIPTION OF THE DRAWINGS

FIG. 4a is a sectional diagram showing an embodiment of the liquid crystal display device of the present invention.

FIG. 4b shows the characteristics I to V of the non-linear-resistive layer.

FIGS. 5, 6 are sectional diagrams showing other embodiments of the liquid crystal display device.

DETAILED DESCRIPTION OF THE PREFERRED EMBODIMENTS

Figure 1:
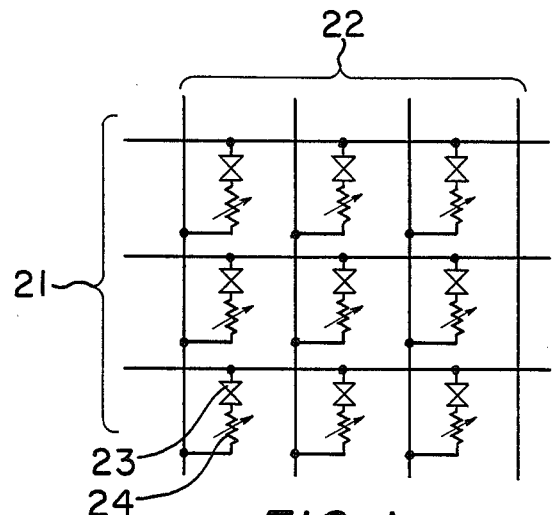
FIG. 1 is a circuit diagram of the conventionally known display device.
Figure 2:
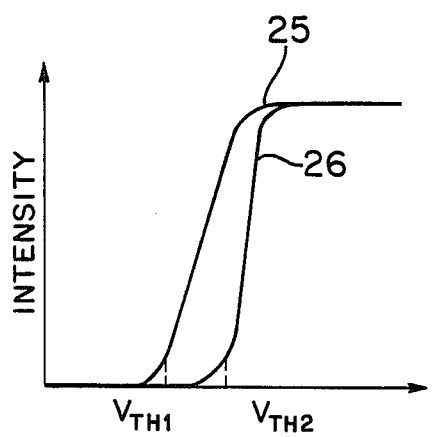
FIG. 2 shows the characteristic of electric voltage corresponding to the transmission factor of the liquid crystal utilizing a conventional non-linear-element.
Figure 3:
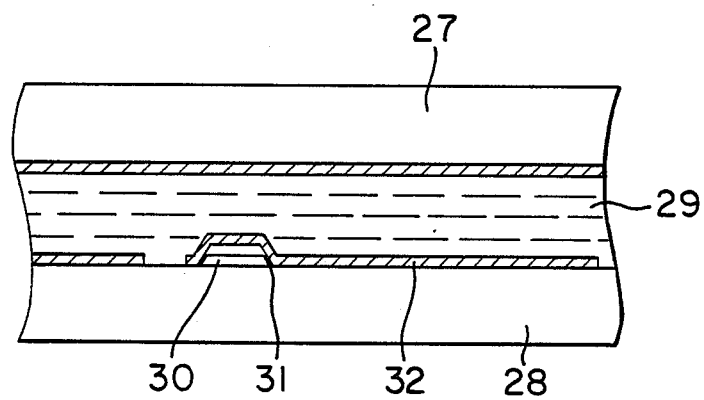
FIG. 3 is a sectional diagram of a liquid crystal display device utilizing a conventionally known non-linear resistive element.

FIG. 4a is a sectional diagram showing an embodiment of the present invention. Numerals 1, 2 are upper and lower transparent substrates made of glass. 3 is an electro-optical material layer in the form of a liquid crystal layer composed of the TN liquid crystal, and 4 is a metal electrode layer on the lower substrate 2. 5 is a transparent conductive layer mounted on the upper substrate 1, and with these two layers 200 lines of X and Y or counter and drive electrode groups are respectively formed to define a plurality of picture elements. FIG. 4a shows one picture element to be mounted at a crossing point of X and Y electrodes. Liquid crystal display metal electrode 4 is made of NiCr. Non-linear-resistive layer 6 is non-stoichiometric silicon oxide having an atom composition ratio O/Si in the range of 0.2 to 1.9 and being formed by low pressure CVD or chemical vapor deposition, and its thickness is 1000 Å. According to AES analysis, the atom composition ratio O/Si of the silicon oxide layer is about 0.5. 7 is a picture element electrode, and is made of a transparent conductive layer. The overlapping or intersecting area of the liquid crystal display electrode 4 and picture element electrode 7 which defines a switching element series-connected to a corresponding picute element is 500 $\mu m^2$.

FIG. 4b shows the I-V characteristic of the non-linear-resistive layer utilized in FIG. 4a. This driving voltage declines from $V_{OP}$ to $V_{OP}/2$, and the electric current declines more than 4 figures. Also when $10^8$ times of the alternating electric field of the drive voltage $V_{OP}$ is applied to the non-linear-resistive layer, the breakdown does not occur, but the layer maintains the I-V characteristic of its initial state. When this liquid crystal display device is driven with multiplex driving method, the contrast ratio of the picture element becomes more than 15:1, and also no cross talk is not observed. As shown in FIG. 4a, the non-linear resistive layer can be comprised of non-stoichiometric silicon oxide layer. By appropriately selecting the flow rate of silane gas $SiH_4$ and ammonia $NH_3$ when conducting low pressure CVD, the characteristic of the non-linear-resistive element can be made similar to that of FIG. 4b.

FIG. 5 is a sectional diagram showing an embodiment of the present liquid crystal display device. Numerals 1,2 are respectively upper and lower transparent substrates, 3 is a liquid crystal layer, 4,5 are respectively transparent electrodes mounted on the upper and the lower substrates, and with these transparent electrodes, X and Y electrode groups are formed. 8,9 are non-linear-resistive layers, each composed of non-stoichiometric silicon oxide layers. The electrical resistance of the layer 9 should be smaller than that of the layer 8 by amount of one figure, so that the atomic composition ratio O/Si=X of the non-linear-resistive layer 9 is made smaller than that of the non-linear-resistive layer 8. This layer 9 is formed by low press CVD, but, it can particularly be formed successively by changing the flow rate of silane gas $SiH_4$ and Nitrogen dioxide gas $N_2O$. The thickness of the non-linear-resistive layers 8,9 are respectively 1000 Å and 100 Å. When the atom composition ratio x is greater than 0.5, the non-linear-resistive layers become transparent. Also, by establishing the distance between the adjacent display transparent electrode 5 and the transparent electrode 10 more than 40 $\mu m$, the leaking electric charge at the picture element selecting time can be kept extremely small. As so far stated, by constructing the non-linear-resistive element in two-layer structure, the electric field is uniformly applied to the liquid crystal of the picture element portion, and thus the unevenness of the display on the picture element portion can be eliminated. Also, as non-linear-resistive layers are formed on the whole surface of the panel except on the connecting pad portion for the display device and the outside driving circuit, the patterning of the non-linear-resistive layer is conducted very easily.

FIG. 6 is a sectional diagram showing an embodiment of the present liquid crystal display device, and transparent conductive layer 12 is formed on the picture element portion between the non-linear-resistive layer 11 and the liquid crystal layer 3. The non-linear-resistive layer is transparent, and is formed on the whole surface of the display panel except on the electrode drawing pad portion connectable to outside circuits. The transparent electrode 12 that contacts the liquid crystal is formed by ITO, has the area of about 200 $\mu m^2$, and thus the pattern accuracy is relieved.

In the present embodimwent, TN liquid crystal is utilized, and the outer surfaces of the upper and lower transparent substrates are sandwiched by a pair of polarizers. Also, the same result can be obtained by utilizing non-stoichiometric silicon having an atom composition ratio N/Si in the range of 0.2 to 1.3 as the non-linear-resistive layer. Furthermore, the non-linear-resistive layer can be formed with normal pressure CVD, plasma CVD, sputters and such.

As stated above, because the present invention utilizes non-stoichiometric silicon oxide layer and silicon nitride layer as non-linear-element, there are such effects as its life-time being long, its accuracy of the pattern-forming of the non-linear-resistive layer being desirably rough, its size being easy to enlarge, and being possible to manufacture at a very low cost.

What I claim is:

1. A matrix electro-optical device comprising: a pair of substrates, at least one of the substrates being light-transmissive; an electro-optical material sandwiched between the substrates; a plurality of electro-optical switching elements disposed on an inner surface of at least one of the substrates, each of the switching elements including a first electrode layer, a non-linear-resistive layer substantially composed of a non-stoichiometric compound of silicon oxide or silicon nitride and electrode means electrically connected to the first electrode layer through the non-linear-resistive layer; and a second electrode layer disposed on an inner surface of the other substrate to define a plurality of picture elements between the second electrode layer and the electrode means for applying a voltage to the electro-optical material in a desired picture element.

2. A matrix electro-optical device as claimed in claim 1; wherein the device comprises a display device.

3. A matrix electro-optical device as claimed in claim 1; wherein the first electrode layer is composed of metal.

4. A matrix electro-optical device as claimed in claim 1; wherein the electro-optical material comprises a liquid crystal.

5. A matrix electro-optical device as claimed in claim 1; wherein the device is driven by a multiplex driving method.

6. A matrix electro-optical device as claimed in claim 1; wherein the atom composition ratios O/Si=x and N/Si=y of non-stoichiometric silicon oxide and silicon nitride are as follows, respectively, $$0.2 \leq x \leq 1.9, \ 0.2 \leq y \leq 1.3.$$

7. A matrix electro-optical device as claimed in claim 1; wherein the non-linear-resistive layer is light-transmissive.

8. A matrix electro-optical device as claimed in claim 1; wherein the non-linear-resistive layer has a thickness more than 400 Å.

9. A matrix electro-optical device as claimed in claim 1; wherein the non-linear-resistive layer is formed by means of low pressure CVD, normal pressure CVD, plasma CVD or sputtering.

10. A matrix electro-optical device as claimed in claim 1; wherein the non-linear-resistive layer is provided over the whole surface of all picture elements.

11. A matrix electro-optical device as claimed in claim 1; wherein the non-linear-resistive layer is provided over the whole surface of the one of the substrates except over the vicinity of a connecting portion to an external member.

12. A matrix electro-optical device as claimed in claim 1; wherein the non-linear-resistive layer is provided over the whole surface of the one of the substrates except over the vicinity of a connecting pad portion to an external driving circuit.

13. A matrix electro-optical device as claimed in claim 1; wherein the electrode means comprises another non-linear-resistive layer composed of a non-stoichiometric compound of silicon oxide or silicon nitride different from that of the first-mentioned non-linear-resistive layer.

14. A matrix electro-optical device as claimed in claim 13; wherein each of the non-linear-resistive layer is composed of a non-stoichiometric compound of silicon oxide having a different atomic composition ratio O/Si=x.

15. A matrix electro-optical device as claimed in claim 13; wherein each of the non-linear-resistive layers is composed of a non-stoichiometric compound of silicon nitride having a different atomic composition ratio N/Si=y.

16. A matrix electro-optical device as claimed in claim 13; wherein said another non-linear-resistive layer in contact with the electro-optical material has an atomic composition ratio O/Si=x or N/Si=y smaller than that of the first-mentioned non-linear-resistive layer in contact with the first electrode layer.

17. A matrix electro-optical device as claimed in claim 1; wherein the electrode means comprises a plurality of picture element electrodes corresponding to respective ones of the picture elements.

18. A matrix electro-optical device as claimed in claim 17; wherein each of the picture element electrodes has one portion overlapping with the corresponding first electrode layer, and the remaining portion extending from said one portion and disposed directly on the inner surface of the substrate.

19. A matrix electro-optical device as claimed in claim 17; wherein each of the picture element electrodes is entirely disposed on the non-linear-resistive layer.

20. A switching device formed on a substrate, comprising: a substrate; and a plurality of electro-optical switching elements on the substrate, each of the switching elements including a first electrode layer, a non-linear-resistive layer substantially composed of a non-stoichiometric compound of silicon oxide or silicon nitride and electrode means electrically connected to the first electrode layer through the non-linear-resistive layer.

21. A switching device as claimed in claim 20; wherein the atom composition ratios O/Si=x and N/Si=y of the non-stoichiometric silicon oxide and silicon nitride are as follows, respectively, $$0.2 \leq x \leq 1.9, \ 0.2 \leq y \leq 1.3.$$

22. A switching device as claimed in claim 20; wherein the non-linear-resistive layer is light-transmissive.

23. A switching device as claimed in claim 20; wherein the non-linear-resistive layer has a thickness more than 400 Å.

24. A switching device as claimed in claim 20; wherein the non-linear-resistive layer is formed by means of low pressure CVD, normal pressure CVD, plasma CVD or sputtering.

25. A switching device as claimed in claim 20; wherein the non-linear-resistive layer is provided over the whole surface of the substrate except the edge thereof.

26. A switching device as claimed in claim 20; wherein the electrode means comprises another non-linear-resistive layer formed on the first-mentioned non-linear-resistive layer and made of a non-stoichiometric compound of silicon oxide or silicon nitride different from that of the first-mentioned non-linear-resistive layer.

27. A switching device as claimed in claim 26; wherein each of the non-linear-resistive layers is made of a non-stoichiometric compound of silicon oxide having a different atomic composition ratio O/Si=x.

28. A switching device as claimed in claim 26; wherein each of the non-linear-resistive layers is made of a non-stoichiometric compound of silicon nitride having a different atomic composition ratio N/Si=y.

29. A switching device as claimed in claim 26; wherein said another non-linear-resistive layer has an atomic composition ratio O/Si=x or N/Si=y smaller than that of the first-mentioned non-linear-resistive layer in contact with the first electrode layer.

30. A switching device as claimed in claim 20; wherein the electrode means comprises a plurality of picture element electrodes corresponding to respective ones of the electro-optical switching elements.

31. A switching device as claimed in claim 30; wherein each of the picture element electrodes has one portion overlapping with the corresponding first electrode layer, and the remaining portion extending from said one portion and disposed directly on the substrate.

32. A switching device as claimed in claim 30; wherein each of the picture element electrodes is entirely disposed on the non-linear-resistive layer.

33. A matrix electro-optical device comprising: a pair of substrates spaced apart from each other, at least one of the substrates being transparent; a plurality of counter electrodes disposed on an inner surface of one of the substrates; electrode means disposed on an inner surface of the other substrate in opposed relation to the counter electrodes; an electro-optical layer interposed between the counter electrodes and the electrode means to define a plurality of picture elements therebetween selectively driven to change their optical state; a plurality of drive electrodes disposed on the inner surface of the other substrate and overlapping with the electrode means; and a non-linear-resistive layer comprised of non-stoichiometric silicon nitride and interposed between the electrode means and drive electrodes at their overlapping portions to define a plurality of switching elements series-connected to the corresponding picture elements, the switching elements being selectively turned on in response to a voltage applied between the counter and drive electrodes to drive the series-connected picture elements.

34. A matrix electro-optical device as claimed in claim 33; wherein the non-stoichiometric silicon nitride has an atom composition ratio N/Si in the range of 0.2 to 1.3.

35. A matrix electro-optical device as claimed in claim 34; wherein the non-linear-resistive layer comprises a chemically-vapor-deposited layer.

36. A matrix-electro-optical device as claimed in claim 34; wherein the electrode means comprises another non-linear-resistive layer composed of non-stoichiometric silicon nitride having an atom composition ratio smaller than that of the non-stoichiometric silicon nitride of the first-mentioned non-linear resistive layer.

37. A matrix electro-optical device as claimed in claim 33; wherein the electrode means comprises a plurality of picture electrodes corresponding to respective ones of the picture elements.

38. A matrix electro-optical device as claimed in claim 37; wherein each of the picture electrodes has one portion overlapping with the corresponding drive electrode, and the remaining portion extending from said one portion and disposed directly on the inner surface of the substrate.

39. A matrix electro-optical device as claimed in claim 37; wherein each of the picture electrodes is entirely disposed on the non-linear-resistive layer.

40. A matrix-electro-optical device comprising: a pair of substrates spaced apart from each other, at least one of the substrates being transparent; a plurality of counter electrodes disposed on an inner surface of one of the substrates; electrode means disposed on an inner surface of the other substrate in opposed relation to the counter electrodes; an electro-optical layer interposed between the counter electrodes and the electrode means to define a plurality of picture elements therebetween selectively driven to change their optical state; a plurality of drive electrodes disposed on the inner surface of the other substrate and overlapping with the electrode means; and a non-linear-resistive layer comprised of non-stoichiometric silicon oxide and interposed between the electrode means and drive electrodes at their overlapping portions to define a plurality of switching elements series-connected to the corresponding picture elements, the switching elements being selectively turned on in response to a voltage applied between the counter and drive electrodes to drive the series-connected picture elements.

41. A matrix electro-optical device as claimed in claim 40; wherein the non-stoichiometric silicon oxide has an atom composition ratio O/Si in the range of 0.2 to 1.9.

42. A matrix electro-optical device as claimed in claim 41; wherein the non-linear-resistive layer comprises a chemically-vapor-deposited layer.

43. A matrix electro-optical device as claimin in claim 41; wherein the electrode means comprises another non-linear-resistive layer composed of non-stoichiometric silicon oxide having an atom composition ratio smaller than that of the non-stoichiometric silicon oxide of the first-mentioned non-linear resistive layer.

44. A matrix electro-optical device as claimed in claim 41; wherein the non-stoichiometric silicon oxide has an atom composition ratio O/Si of about 0.5.

45. A matrix electro-optical device as claimed in claim 40; wherein the electrode means comprises a plurality of picture electrodes corresponding to respective ones of the picture elements.

46. A matrix electro-optical device as claimed in claim 45; wherein each of the picture electrodes has one portion overlapping with the corresponding drive electrode, and the remaining portion extending from said one portion and disposed directly on the inner surface of the substrate.

47. A matrix electro-optical device as claimed in claim 45; wherein each of the picture electrodes is entirely disposed on the non-linear-resistive layer.

* * * * *